US011164355B1

(12) United States Patent
Phogat et al.

(10) Patent No.: US 11,164,355 B1
(45) Date of Patent: Nov. 2, 2021

(54) SHAPE AWARE TRANSFORMATION

(71) Applicant: ADOBE INC., San Jose, CA (US)

(72) Inventors: Ankit Phogat, Uttar Pradesh (IN); Kevin Wampler, Seattle, WA (US); Wilmot Li, Seattle, WA (US); Matthew David Fisher, San Carlos, CA (US); Vineet Batra, Delhi (IN); Daniel Kaufman, Seattle, CA (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/856,269

(22) Filed: Apr. 23, 2020

(51) Int. Cl.
*G06T 11/60* (2006.01)
*G06T 11/20* (2006.01)

(52) U.S. Cl.
CPC ............ *G06T 11/60* (2013.01); *G06T 11/203* (2013.01)

(58) Field of Classification Search
CPC .............................. G06T 11/60; G06T 11/203
See application file for complete search history.

(56) References Cited

U.S. PATENT DOCUMENTS

2011/0122139 A1* 5/2011 Lee ...................... G06T 11/203
345/441

OTHER PUBLICATIONS

Q.-X. Huang, R. Meeh and N. Carr, "Optimizing structure preserving embedded deformation for resizing images and vector art", Comput. Graph. Forum, vol. 28, No. 7, pp. 1887-1896, 2009. (Year: 2009).*

(Continued)

*Primary Examiner* — Jennifer Mehmood
*Assistant Examiner* — Andrew Shin
(74) *Attorney, Agent, or Firm* — F. Chau & Associates, LLC

(57) ABSTRACT

Systems and methods for editing an image based on multiple constraints are described. Embodiments of the systems and methods may identify a change to a vector graphics data structure, generate an update for the vector graphics data structure based on strictly enforcing a handle constraint, a binding constraint, and a continuity constraint, adjust the vector graphics data structure sequentially for each of a plurality of sculpting constraints according to a priority ordering of the sculpting constraints, generate an additional update for the vector graphics data structure based on strictly enforcing the binding constraint and the continuity constraint and approximately enforcing the handle constraint and the sculpting constraints, adjust the vector graphics data structure sequentially for each of a plurality of sculpting constraints, and display the vector graphic based on the adjusted vector graphics data structure.

20 Claims, 10 Drawing Sheets

(56) References Cited

OTHER PUBLICATIONS

Gilbert Louis Bernstein et al., "Lillicon: Using Transient Widgets to Create Scale Variations of Icons", ACM Trans. Graph., 34(4):144:1-144:11, Jul. 2015.
Takeo Igarashi, et al., "As-Rigid-as-Possible Shape Manipulation", ACM Trans. Graph., 24(3):1134-1141, Jul. 2005.
Alec Jacobson, et al., "Bounded Biharmonic Weights for Real-Time Deformation", ACM Trans. Graph., 30, 2011.
Songrun Liu, et al., "Skinning Cubic Bézier Splines and Catmull-Clark Subdivision Surfaces" ACM Transactions on Graphics, 33(6), 2014.
U. Pinkall, et al., "Computing Discrete Minimal Surfaces and Their Conjugates", Experimental mathematics, 2(1):15-36,1993.
Katie A. Siek, et al., "Fat Finger Worries: How Older and Younger Users Physically Interact With PDAs", Proceedings of the 2005 IFIP TC13 International Conference on Human-Computer Interaction, INTERACT'05, pp. 267-280, Berlin, Heidelberg, 2005 Springer-Verlag.

\* cited by examiner

SHAPE AWARE TRANSFORMATION

BACKGROUND

The following relates generally to image editing, and more specifically to editing vector graphics based on multiple constraints.

Vector graphics are a form of computer graphics defined in terms of control points connected by lines and curves (e.g., Bezier curves). Colors and textures may be applied to a vector graphic based on stroke and fill parameters for the lines, curves, and shapes.

Vector graphics are useful because the lines and curves can be easily scaled or transformed using simple mathematical transformations.

However, aside from a few basic transformations, creating, editing, and manipulating vector graphics can be time consuming because it typically involves manipulating control points individually. Therefore, there is a need in the art for systems and methods to efficiently manipulate vector graphics.

SUMMARY

A method, apparatus, and non-transitory computer readable medium for editing an image based on multiple constraints are described. Embodiments of the method, apparatus, and non-transitory computer readable medium may include receiving a command to edit the vector graphic, wherein the vector graphic is represented by a vector graphics data structure including a mesh network and a plurality of control points; generating an update for the vector graphics data structure by reducing a deformation of the vector graphics data structure resulting from on the command; adjusting the vector graphics data structure sequentially for each of a plurality of sculpting constraints according to a priority ordering of the sculpting constraints based on the update; and displaying the vector graphic based on the adjusted vector graphics data structure.

Another method, apparatus, and non-transitory computer readable medium for editing an image based on multiple constraints are described. Embodiments of the method, apparatus, and non-transitory computer readable medium may include identifying a change to a vector graphics data structure representing a mesh network and a plurality of control points for a vector graphic; generating an update for the vector graphics data structure based on enforcing a handle constraint, a binding constraint, and a continuity constraint; adjusting the vector graphics data structure sequentially for each of a plurality of sculpting constraints according to a priority ordering of the sculpting constraints based on the update; generating an additional update for the vector graphics data structure based on enforcing the binding constraint, the continuity constraint, the handle constraint, and the sculpting constraints; adjusting the vector graphics data structure sequentially for each of the plurality of sculpting constraints according to the priority ordering of the sculpting constraints based on the additional update; and displaying the vector graphic based on the adjusted vector graphics data structure.

Another method, apparatus, and non-transitory computer readable medium for editing an image based on multiple constraints are described. Embodiments of the method, apparatus, and non-transitory computer readable medium may identify a change to a vector graphics data structure representing a mesh network and a plurality of control points for a vector graphic, generate an update for the vector graphics data structure based on strictly enforcing a handle constraint, a binding constraint, and a continuity constraint, adjust the vector graphics data structure sequentially for each of a plurality of sculpting constraints according to a priority ordering of the sculpting constraints based on the update, generate an additional update for the vector graphics data structure based on strictly enforcing the binding constraint and the continuity constraint and approximately enforcing the handle constraint and the sculpting constraints, adjust the vector graphics data structure sequentially for each of a plurality of sculpting constraints according to the priority ordering of the sculpting constraints based on the additional update, and display the vector graphic based on the adjusted vector graphics data structure.

DETAILED DESCRIPTION

Figure 1:
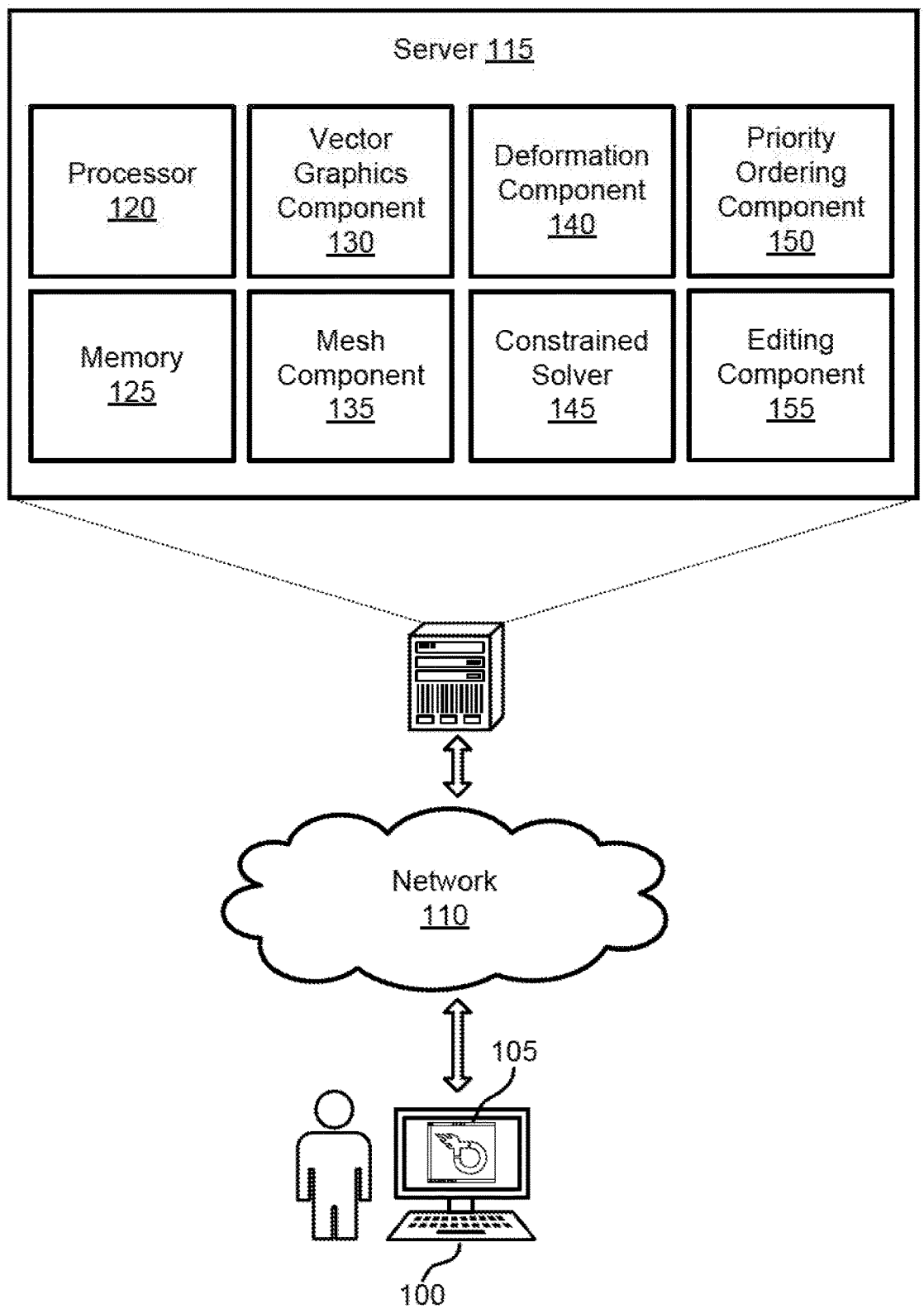
FIG. 1 shows an example of a system for image editing according to aspects of the present disclosure.

The present disclosure relates generally to a systems and methods for editing vector graphics. Embodiments of the present disclosure automatically alter a vector graphics image based on user input, while maintaining multiple different constraints. Designers often use vector graphics due to their scalability. Such users seek precise and intuitive control of their designs, while imposing and preserving higher-level structural relationships, such as alignment, concentricity, continuity, similarity and angle. In some cases, users may wish to impose constraints on some portions of a design while performing free-form edits in other portions.

Control point manipulation using standard computer set-ups (such as a mouse or keyboard) can be challenging and time consuming. Touch-enabled tablet devices can be easier for some people, but they can also be subject to imprecision (i.e., the "fat-finger" problem) that makes some graphics manipulations impractical.

Conventional vector graphics tools include free form deformation tools for Bezier curve segments of a vector graphic. Free-form deformation methods can preserve vector components such as Bezier structure, angles, and continuity under deformation, but do not preserve high-level structural relationships in vector artwork. For example, a logo design may incorporate multiple circular elements that have a same center point. Since the constraint of having the same center point relates to multiple separate curves, it will not be preserved by a free-form deformation tool. Other high-level structural relationships include vector alignment, concentricity, continuity, and similarity actions that resolve nonlinear constraints. Free-form deformation methods do not support higher-level editing handles to manipulate such structural relationships.

As an alternative to free-form deformation tools, geometric editing tools enable manipulation of vector graphics while preserving a few predefined geometric constraints. However, conventional geometric editing tools do not support free-form deformation. For example, edits might be made by editing numerical parameters, or dragging control points in a constrained way that results in editing one or more pre-defined parameters of a curve.

One of the reasons that conventional editing tools do not support both free-form editing and high-level constraint enforcement is that the free-form edits can be inconsistent with the constraints. In some cases, a user may even wish to impose constraints that are inconsistent with each other. Another issue that arises is that satisfying the constraints may result in constraint lock, where only one or a limited number of solutions exist that satisfy the constraints.

Therefore, embodiments of the present disclosure include a vector sculpting tool that supports free-form editing and satisfaction (or at least approximate satisfaction) of high level constraints. Approximate satisfaction of constraints refers to enforcement of a constraint in a manner such that an equation or relation representing the constraint is not exactly satisfied, but for which a process has been performed to reduce the deviation from satisfying the constraint, the deviation falls below an acceptable threshold, or both. Approximate enforcement may be contrasted with strict enforcement, which refers to enforcement of a constraint in a manner such that an equation or relation representing the constraint is exactly satisfied.

Certain embodiments provide systems for efficiently updating a vector graphic that may be performed in real time as a user edits an image. A vector sculpting tool may be used to support user-friendly direct manipulation of vector artwork. The disclosure also describes vector sculpting methods that enable higher-level handles to manipulate constraint parameters directly. The described combination of capabilities provides the machinery for user interactions that support intuitive, high-level editing of vector graphics. According to various embodiments, vector sculpting can be applied both on desktop and on tablets with touch-based interaction.

By enabling intuitive control that incorporates both high level constraints and free-form control, embodiments of the present disclosure may provide users of an image editing application high level, yet precise control in a manner that saves time and improves precision.

System Overview

FIG. 1 shows an example of a system for image editing according to aspects of the present disclosure. The example shown includes user device 100, network 110, and server 115. User device 100 may include image editing application 105 (e.g., for editing vector graphics).

A user may edit a vector graphic using an image editing application 105 on a user device 100. In some embodiments, edits may be communicated to a server 115 via network 110. The server 115 may then calculate image updates that balance multiple constraints simultaneously (i.e., finds approximate solutions that come close to satisfying the constraints). However, the present disclosure is not limited thereto. For example, the components described as being located within the server 115 may also be located within the user device 100 (e.g., within the image editing application 105).

After an edit by the user, the server 115 or the user device 100 may perform multiple iterations of an update loop. According to some embodiments, an updated vector graphic is displayed to the user after each iteration of the loop.

According to an exemplary embodiment, the loop may include a rebuild check that includes checking for changes in a mesh network. The mesh network may refer to a triangulation of a domain that includes a vector graphic. The mesh network may include node points of triangles covering the space, and the position of the control points relative to the nodes.

If any terms are new, dependent structures relying on the updated terms may be reset and recomputed. Next, a constrained Sobolev-preconditioned gradient-descent may be performed to update the current solution to reduce deformation while enforcing global handle, binding constraints, continuity constraints, and also enforcing sculpting constraints. For example, the handle, binding constraints, and continuity constraints may be exactly enforced, while the sculpting constraints may be approximately enforced.

Continuity constraints may refer to relations representing the continuity of different curves in a vector graphic. Continuity constraints can apply to continuity of position (i.e., that two curves touch at some point), direction (i.e., the angle at which they touch), or curvature, etc.

Binding constraints may refer to constraints that define the connection between vector graphic primitives and the underlying mesh network. For example, given a curve segment, a set of parameterization points may be defined, and barycentric coordinates relative to the mesh.

Handle constraints may refer to constraints representing bindings between free-form editing "handles" and the underlying mesh network. Each handle may be embedded in the triangle mesh so that whenever it is moved (e.g., by a user edit) it drives deformation of the mesh.

Sculpting constraints may refer to a set of functions that define relationships between various elements of a vector graphic. Sculpting constraints may be defined in terms of a global data structure including all design degrees of freedom for control points and curves of a vector graphic.

In some cases, a constrained Sobolev-preconditioned gradient-descent may be solved based on a first quadratic programming (QP) solver. A Sobolev space is a vector space of functions with a norm that includes Lp-norms of the function together with a certain number of derivatives. In some cases, weak solutions for a gradient descent may exist in a Sobolev space even when there are no strong solutions in spaces of continuous functions with traditional derivatives.

Next, a priority-ordered projection may be performed to sequentially project the current solution to satisfy sculpting constraints based on the current priority ordering. Then, a constrained continuity and binding step may solve a second QP to re-project the current solution to enforce global binding and continuity constraints while enforcing the updated sculpting and handle constraints. For example, the binding constraints and continuity constraints may be exactly enforced, while the handle and sculpting constraints may be approximately enforced.

Finally, another priority-ordered projection may be used to re-project the current solution to satisfy sculpting constraints. For example, a final priority-ordered projection may enforce each sculpting constraint exactly. However, enforcing a subsequent constraint may then cause a previous constraint to be only approximately enforced.

There are at least two cases of constraint inconsistency to be addressed. The first case of constraint inconsistency is infeasibility, where a set of mutually inconsistent constraints are applied. In these cases, no feasible solution exists that can satisfy all constraints simultaneously. Constrained optimization methods may be unable to return a solution. Instead, a solver is used to provide a reasonable solution in all cases. The second case of constraint inconsistency is locking. Locking describes a situation where a set of mutually feasible constraints are detected or applied. If a solver satisfies the mutually feasible constraints, the solution is effectively locked so little to no change to the artwork is possible, no matter what handles or widgets are manipulated. Instead, manipulations are used to produce reasonable updates to the artworks that do not lock, unless explicitly requested.

The present disclosure addresses both efficiency and constraint-inconsistencies. For example, embodiments of the present disclosure describe a constrained deformation solver that alternates steps of constrained Sobolev-preconditioned gradient descent, with ordered projections onto constraint sets. Each step of the Sobolev-preconditioned gradient descent is efficient and satisfies multiple constraints simultaneously. Ordered projections onto constraint sets are, in turn, defined by priorities. Constraints with higher priorities are satisfied while some or all manipulations may avoid issues from locking and infeasibility.

The vector sculpting solver enables editing interactions between selected manipulations and nearby artwork. The vector sculpting solver of the present discourse provides editing interactions that combine both freeform and constrained manipulations. For example, the present disclosure provides constrained interactions between circular arcs and gaps in a part of a design. Additionally, the present disclosure provides free-form dragging of artwork.

For example, server 115 may include processor 120, memory 125, vector graphics component 130, mesh component 135, deformation component 140, constrained solver 145. In some cases, these components may be located within (or the functions thereof may be performed locally) by the user device 100.

A processor 120 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 120 may be configured to operate a memory 125 array using a memory 125 controller. In other cases, a memory controller may be integrated into processor 120. The processor 120 may be configured to execute computer-readable instructions stored in a memory 125 to perform various functions.

A computer memory 125 may store information for various programs and applications on a computing device. For example, the storage may include data for running an operating system. The memory 125 may include both volatile memory and non-volatile memory. Volatile memory may random access memory (RAM), and non-volatile memory may include read-only memory (ROM), flash memory, electrically erasable programmable read-only memory (EEPROM), digital tape, a hard disk drive (HDD), and a solid state drive (SSD). Memory 125 may include any combination of readable and/or writable volatile memories and/or non-volatile memories, along with other possible storage devices.

Vector graphics component 130 displays vector graphics including updated vector graphics based on an adjusted vector graphics data structure after each iteration of an update loop. In some examples, a vector graphic includes a set of Bezier curves defined by the set of control points.

Mesh component 135 identifies a vector graphics data structure representing a mesh network and a set of control points for a vector graphic. Mesh component 135 may also identify changes to the vector graphics data structure. In some examples, the mesh network includes a triangular mesh defined by a set of nodes. Mesh component 135 may also repeat an update loop multiple times based on a single change to the vector graphics data structure.

Deformation component 140 performs the constrained Sobolev-preconditioned gradient-descent. Deformation component 140 may generate an update for the vector graphics data structure based on the change by reducing a deformation of the vector graphics data structure. In some examples, the deformation of the vector graphics data structure is based on sculpting constraints, a mesh binding constraint, and curve continuity constraint, or a handle constraint. In some examples, the update is based on a gradient descent of a deformation energy of the mesh network and strict enforcement of a constraint on the vector graphics data structure. In some examples, the gradient descent includes a constrained Sobolev-preconditioned gradient descent.

Constrained solver 145 performs the constrained continuity and binding step. Constrained solver 145 may generate an additional update for the vector graphics data structure based on approximately enforcing the constraint and the set of sculpting constraints. In some examples, the initial update is based on a first quadratic programming (QP) solver, and the additional update is based on a second QP solver. In some cases, constrained solver 145 may generate the additional update for the vector graphics data structure based on approximately enforcing one or more constraints.

In some examples, constraints for the initial update (i.e., which may be performed by deformation component 140) include approximately enforcing sculpting constraints, and approximately enforcing a handle constraint, a binding constraint and a continuity constraint. The additional update (performed by the constrained solver 145) may include approximately enforcing sculpting and handle constraints while strictly enforcing the binding constraint and the continuity constraint.

In some examples, the handle constraint includes a position of a handle point of the vector graphic. In some examples, the binding constraint includes a sample of points of the vector graphic and barycentric coordinate weights based on the mesh network for each of the sample of points. In some examples, the continuity constraint includes a representation of the connectivity between two or more segments of the vector graphic.

Priority ordering component 150 performs the priority-ordered projection. Priority ordering component 150 may adjust the vector graphics data structure sequentially for each of a set of sculpting constraints according to a priority ordering of the sculpting constraints. The Priority ordering component 150 may adjust the vector graphics data structure after the first update (performed by deformation component 140) and after the second update (performed by the constrained solver 145).

Editing component 155 receives an editing command from a user, where the change is based on the editing command. In some examples, the editing command includes movement of a handle point on the vector graphic. For example, a user may click-and drag a control point with a mouse, or drag a control point with a touch-based implement on a screen.

Figure 2:
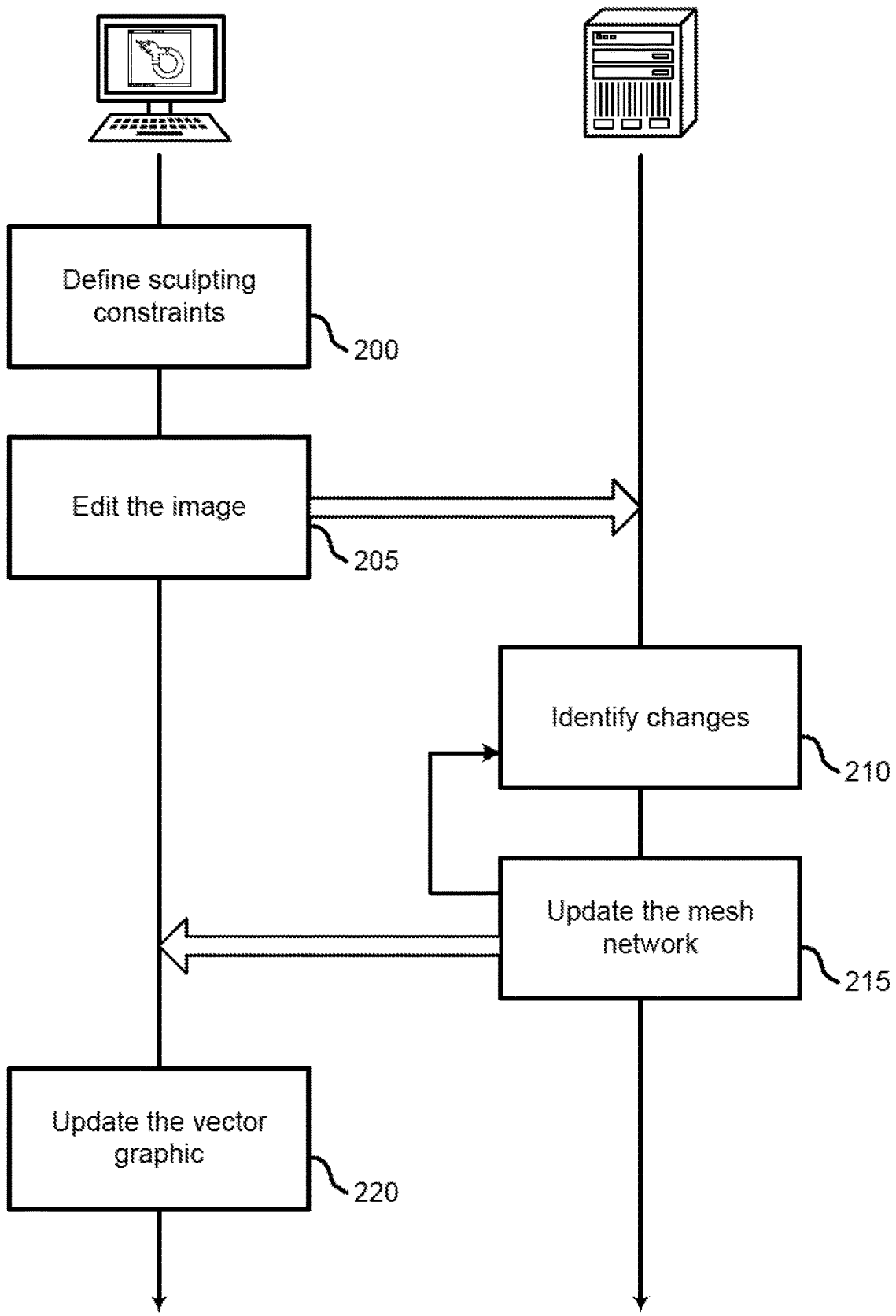
FIG. 2 shows an example of a process for image editing according to aspects of the present disclosure.

FIG. 2 shows an example of a process for image editing according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 200, a user defines multiple sculpting constraints on a vector graphic. For example, the user may establish that two circles are concentric, or that two lines are parallel, or that a certain portion of a graphic should have constant proportions.

At operation 205, the user edits the image. For example, the user may make a free-form edit by defining and then moving an editing handle (e.g., by clicking and dragging a vector graphics curve at an arbitrary point—not necessarily a control point).

At operation 210, the system identifies changes in a mesh network based on the editing. In some cases, the operations of this step may refer to, or be performed by, a mesh component as described with reference to FIG. 1. For example, an editing handle may change the position of one or more points on a curve with respect to a triangular mesh network (which may be invisible to the user).

At operation 215, the system updates the mesh network based on the changes according to multiple constraints. In some cases, the operations of this step may refer to, or be performed by, a server or a user device as described with reference to FIG. 1.

For example, according to embodiments of the present disclosure, a vector sculpting solver models the constrained deformation manipulation problem as a nonlinear minimization of deformation energy, defined on a vector graphics mesh structure. Vector sculpting may be subject to satisfying nonlinear constraints preserving structure identified on the graphics. In some cases, the vector sculpting is performed according to a multiple step runtime loop as described herein (e.g., including the five steps of a rebuild check, a constrained Sobolev-preconditioned gradient descent, a priority ordered projection, a constrained continuity and binding solve, and a final priority-ordered projection).

In some cases, vector graphic structure may be preserved. For example, all cubic Bezier curves remain cubic Beziers over a number of edits. The issues of efficiency and constrain inconsistency are addressed to preserve vector graphic structure. Nonlinear minimization methods that handle nonlinear constraints can be computationally expensive and slow when used in the present disclosure, where interactive rate solutions for tablets and laptops are used.

Thus, in response to free-form dragging, the solver produces organic deformation, while preserving the circularity of other parts of the artwork, and the parallel relationships of the gaps. This combination of deformation behaviors relies on the solver's ability to model and propagate deformation energies in the mesh domain while also preserving structural constraints. Vector sculpting also provides users the ability to control the spatial extent (or region-of-influence) of a given interaction. For example, when the user manipulates a specific constraint parameter, such as a radius of an outer boundary, the mesh-based deformation energies provide control to influence the manipulation of nearby parts near the outer boundary, such as, for example, smaller concentric arcs. Control of the region-of-influence is useful for free-form deformations. The solver's ability to combine deformation energies with constraints provides for control over editing operations.

At operation 220, the system updates the vector graphic based on the updated mesh network. For example, the updated vector graphic may be displayed to a user after an iteration of a runtime loop involving multiple constraints. In some cases, the operations of this step may refer to, or be performed by, an image editing application in a user device as described with reference to FIG. 1.

Figure 3:
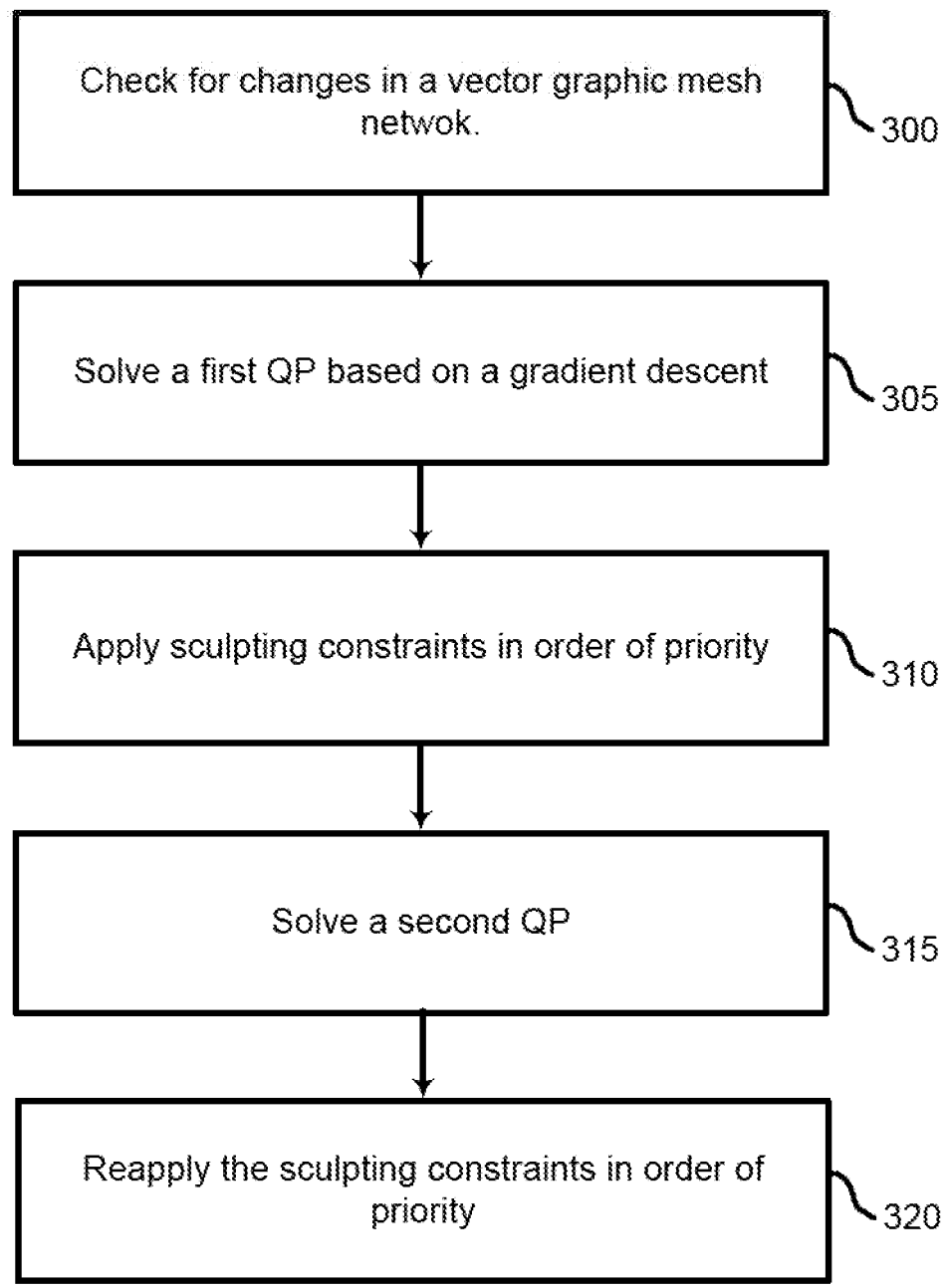
FIG. 3 shows an example of a runtime loop for image editing according to aspects of the present disclosure.

FIG. 3 shows an example of a runtime loop for image editing according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

Prior to describing the steps of the runtime loop itself, further detail regarding the mesh network and constraints is described.

Mesh Network

The Sobolev-preconditioned gradient descent method begins with an initial set of 2D vector graphics and a corresponding triangulation of the 2D domain. The initial set of 2D vector graphics may be constructed by m control points $c_i \in \mathbb{R}^2$ concatenated into a global vector graphic matrix $c=(c_1, c_m)^T \in \mathbb{R}^{2m}$. Additionally, the corresponding triangulation of the 2D domain embeds vector graphics. The corresponding triangulation then uses $\ell$ mesh vertices $v_i \in \mathbb{R}^2$ concatenated into a global mesh matrix $v=(v_1, \ldots, v_\ell)^T \in \mathbb{R}^{2\ell}$. A combined structure of vector graphics, vector graphic connectivity, and continuity data with triangulated mesh data, vector topology data, and mapping data. The mapping data may include vector graphics data and mesh data, also known as a mesh network. For each curve j, the equation $B_j(t)$ provides a corresponding curve basis. For concreteness, cubic Bezier segment with control points in $\mathbb{R}^2$ parameterized by $t \in [0,1]$ may be used. A Bezier curve segment j is then composed of a curve defined by an associated four control points indexed from the vector c, $p_j = (c_{1(j)}, c_{2(j)}, c_{3(j)}, c_{4(j)})^T \in \mathbb{R}^8$ to provide the corresponding Bezier segments $$b_j(t, p_j) = B_j(t) p_j \qquad (1)$$

where $$B_j(t) = ((1-t)^3, 3(1-t)^2 t, 3(1-t)t^2, t^3) \otimes Id_2. \qquad (2)$$

Design degrees of freedom (DOFs) are then concatenated into the global DOF vector $x=(v^T, c^T)^T \in \mathbb{R}^{2n}$, with $n = \ell + m$. At runtime, x is updated at each iteration of a design loop. Iterations are designated as i, i+1, . . . .

Deformation energies $E(x)$ may be built on the mesh, and on the vector graphic DOF, to support free-form deformation and couple manipulations across otherwise unconnected constraint groups. For example, an as-rigid-as possible (ARAP) energy can be discretized on the triangles with piecewise linear elements. Therefore, the ARAP energy may be defined by evaluating current positions of the mesh vertices.

The vector sculpting constraint functions are defined on groups to support constrained and structure-preserving manipulation. Groups are defined as any subset of vertex or vector graphic DOFs. During an editing session, K constraint functions $g_k(x, u_k)$, with $k \in [1, K]$ may be used. For each constraint, additional parameters $u_k$ are used. For example, this could be the current rotation of a rigidity constraint. The parameters presented in the present disclosure provide higher-level handle and widget-based manipulations. The parameters may be changed by user input such as touch, widget, slider, etc. Changing parameters may be used to, for example, rotate a group. Constraints may be preserved when the parameters remain fixed. As a result, for example, a rotation angle may be maintained. The parameters can also be driven by parameter sweeps, exploration, and/or other interaction modes. As a result, the satisfaction of a constraint is given by $g_k(x, u_k)=0$ while an effect on user artwork can be changed by manipulating the parameter's $u_k$.

In an example scenario, different groups of user-generated graphical lines may be grouped and assigned different constraints in the same artwork. A 'parallel' constraint may be applied to a group of graphical lines, a 'similar' constraint may be applied to a different group of graphical lines in the same artwork. A group may span multiple artworks.

Constraints

A mesh network and associated constraints are created to start a vector sculpting session. Graphical structures are then precomputed to be reused for the vector sculpting session. A vector sculpting session may begin by precomputing the current mesh's scalar cotan Laplacian matrix $L \in \ell^2 \ell^{\times 2}$ $\ell$ and a corresponding global pre-conditioning matrix $$M = \begin{pmatrix} L & 0 \\ 0 & \rho I_m \end{pmatrix} \quad (3)$$

where $\rho$ is a small weighting term and $I_m$ is the m×m identity matrix. For example, a weighting term may be $\rho=10^{-8}$.

Linear constraints may be used to bind the mesh and vector graphic. First, a sample is taken along non-degenerate (non-point) vector graphic primitives j at parameterization points $t_{i,j} \in [0, 1]$. Then, for each sample point, the corresponding curve basis weights are given by $B_j(t_{i,j})$ so that the location of each sample point is $B_j(t_{i,j})p_j \in \ell^2$. The triangle the sample point lies in is determined and each point's barycentric coordinate weights $w_{i,j} \in \ell^3$ in the mesh is computed.

As a result, there may be a total of s samples at parameterization points $t_{i,j}$ along the curves (ignoring degenerate singleton vector points). Global mesh binding matrices $B_v \in \ell^{s \times m}$, $B_c \in \ell^{s \times} \ell$ are built with each row of both dedicated to one sample point's binding. For each $t_{i,j}$, per row in Bc, the curve basis weight entries $B_j(t_{i,j})$ are distributed to corresponding control points entries for curve j in x and. Additionally, for each $t_{i,j}$, per row in $B_v$ the curve basis weight entries $B_j(t_{i,j})$ distribute barycentric coordinate weights $w_{i,j}$ to the corresponding three mesh vertex entries for the sample point's containing triangle. As a result, $(B_v B_c)x=0$ is the linear binding constraint.

To analyze the vector graphic connectivity in the mesh-network, a continuity constraint matrix C is built to enforce C1, C0 and approximate G1 continuity. To maintain C0 continuity between two currently connected curve segments $c_j$ and $c_k$ is used:

$$C_0^{j,k} c = (0,0,0,1) \otimes Id_2 p_j + (-1,0,0,0) \otimes Id_2 p_k = 0. \quad (4)$$

To maintain C1 continuity, the following equation may be used:

$$C_1^{j,k} c = (0,0,0,-1) \otimes Id_2 p_j + (-1,1,0,0) \otimes Id_2 p_k = 0. \quad (5)$$

Note that in processing the vector graphics network, duplicate and/or co-located control end/start points are replaced on connected curves with a single control point to reduce DOF and implicitly enforce C0 continuity. C1 continuity constraints at the control points follow directly from the above C1 constraint by substitution. Then, a global continuity constraint matrix C is built by visiting each curve-pair adjacency. Adjacency is determined to satisfy parameters using the above C0 and/or C1 conditions. If the adjacency is determined to satisfy parameters, a row with entries corresponding to the appropriate curve control points involved, as given above, is provided. Then Cc=0 is the linear continuity constraint.

A selection matrix S is built that uses nonzero unit entries (one row per DOF) for each DOF constrained by any of the K sculpting constraints. Each row of Sx then extracts DOFs constrained by sculpting. The gradient descent model solves then uses the selector matrix to add a quadratic penalty term $$\frac{k_s}{2} \|Sp\|^2$$

to penalize a movement of the sculpting constraint DOFs between projections.

For handle constraints, singleton point vector graphics are supported as free-floating elements in the mesh network. Each handle may be embedded in the triangle mesh where point handles may be moved by edits, and the point handles drive deformation of the mesh and the mesh network. To support this workflow, a handle matrix $H \in \mathbb{R}^{y \times n}$ is constructed for y handles on singleton vector points. For each singleton vector point $c_h \in \mathbb{R}^2$, barycentric coordinate weights $W_h \in \mathbb{R}^3$ are determined in the mesh and corresponding enclosing mesh vertices. Each handle is given a row in the handle matrix. The handle matrix is built per row h with $w_h$ scattered to corresponding vertex entries.

Then, in an optimization process, h may be set to the current handle positions as $h=(c_1, \ldots, c_y)^T \in \mathbb{R}^{y \times 2}$. As a result, enforcing Hx=h satisfies the current handle constraints. However, handle constraints can quickly over constrain solutions and so loose enforcement of handles is enabled by applying iterations with a quadratic penalty constructed with H.

Precomputation is performed by assembling constraints into a handle, binding, and continuity constraint matrix $$G_1 = \begin{pmatrix} H & 0 \\ B_v & B_c \\ 0 & C \end{pmatrix}, \quad (6)$$

and a binding and continuity constraint matrix:

$$G_2 = \begin{pmatrix} B_v & B_c \\ 0 & C \end{pmatrix} \quad (7)$$

Finally, Quadratic Programming (QP) solvers are provided for handling the above two types of equality constrained problems. The first solver resolves instances of a QP for minimizing $$\min_p \frac{1}{2} p^T A_1 p - b \quad \text{s.t.} \quad G_1(p + x_i) = 0 \tag{8}$$

for arbitrary inputs of b and g. Here $A_1=(M+k_sS)$, with $k_s=10^{-3}$. The second solver resolves instances of a QP for minimizing $$\min_p \frac{1}{2} p^T A_2 p - b \quad \text{s.t.} \quad G_2(p + x_i) = 0 \tag{9}$$

for arbitrary inputs of b. Here $A_1=(M+k_sS+k_hH^T H)$, with $k_s=10^{-3}$ and $k_h=10^3$.

Runtime Loop

Online optimization may be performed during a vector sculpting session. An example of a runtime loop for online optimization is described below. The solver is continuously looped while enabling interactive edit changes. The interactive edit change process is visualized by animating updates to input artwork during user iterations. Thus, users are provided with the ability to visualize changes created with the solver and may interrupt the solver on any iteration with changes to the constraint parameters, handles, or changes to the input artwork.

The runtime loop may be performed multiple times, and each iteration may be indicated by an index, i. At each step i, a current global vector graphics data structure given by DOF $x_i$ may be updated to a new vector graphics data structure described by DOF $x_{1+1}$. Additional auxiliary matrices such as g, b, $p_i \Sigma \mathbb{R}^{n \times 2}$ may also be used. Variable p represents a computed update step, and b and g store linear updated terms for the QP objective and constraints respectively.

Each step of the loop applies the following substeps in order. A rebuild checks step checks for changes in the mesh network. If any terms are new, dependent structures relying on the updated terms are recomputed and reset. Next, a Constrained Sobolev-preconditioned gradient-descent step updates the current solution to reduce deformation while enforcing global handle, binding and continuity constraints and enforcing sculpting constraints. For example, the handle, binding constraints, and continuity constraints may be exactly enforced, while the sculpting constraints may be approximately enforced.

Next, a Priority-Ordered Projection step sequentially projects a current solution to satisfy sculpting constraints based on the current priority ordering. Next, a Constrained Continuity and Binding solve provides a second QP to re-project the current solution to enforce global binding and continuity constraints while enforcing the updated sculpting and handle constraints.

Lastly, a Final Priority-ordered Projection step sequentially re-projects the current solution to satisfy sculpting constraints based on the current priority ordering. This is the result visualized on the next on-animate call of the solver. These substeps employ three primary computational components. The three primary computational components are constrained Sobolev gradient descent steps, constrained continuity, and binding solves, and ordered projections.

Thus, at operation 300, the system may check for changes in a vector graphics mesh network. For example, each step of a constrained Sobolev gradient-descent may begin by updating positions of singleton vector points, $c_h \in \mathbb{R}^2$, $\forall h \in [1, y]$ to a latest value. For example, the positions of singleton vector points may be live updated to drive handle-based manipulations, which may be exposed in the user interface (UI). The handle position constraint RHS matrix $h \leftarrow (c_1, \ldots, C_H)^T$ are then updated. Next, constraint evaluation is provided by clearing the current constraint RHS, $g \leftarrow 0$. Possibly updated current positions of handles are assigned to the associated submatrix, $g(l:l+y) \leftarrow h$. Finally, the current linear constraint evaluation is removed, $g \leftarrow g = G_1 x_i$.

At operation 305, the system may solve a first QP based on a gradient descent. For example, a preconditioned gradient descent step may be computed. The computation is provided by solving:

$$p_i \leftarrow \text{argmin}_p \frac{1}{2} p^T A_1 p + p^T \nabla E(x_i) \quad \text{s.t.} \quad G_1 p = g. \tag{10}$$

A full descent step is performed with $p_i$ updating the iterate by $x_i \leftarrow x_i + p$. The update satisfies the constraint $G_1(x_i+p)=h$.

At operation 310, the system may apply the sculpting constraints according to a priority ordering. The priority ordering may refer to an order imposed on a set of constraints to be applied that enables the constraints to be strictly enforced in sequence even if imposing them all simultaneously is not possible (i.e., if they are mutually exclusive).

At operation 315, the system may solve a second QP. For example, the second QP solve may begin by updating the linear term of a constrained penalty solve to $b \leftarrow -k_h H^T(h-Hx_i)$. This term is used to perform the application of a soft-penalty to enforce handle constraints in the second quadratic solve. Here, a complete penalty energy is $E_H(p)=k_h/2(H(x+p)-h)^T(H(x+p)-h)$. As a result, the equation $\nabla_x E_H=k_h H^T H x - k_h H^T(h-Hp)$ is provided. Here, the constant $k_h H^T H$ is already added to a quadratic term in the pre-computed matrix, $A_2$, while the remaining $-k_h H^T(h-p)$ is updated in b. Next, the current solution's binding and continuity constraints are evaluated, subtracting from the RHS, $g \leftarrow -G_2 x_i$.

The constrained penalty solve is then determined to receive the updated $$p_i \leftarrow \text{argmin}_p \frac{1}{2} p^T A_2 p + p^T b \quad \text{s.t.} \quad G_2 p = g, \tag{11}$$

and takes a full step with the new $p_i$. The determination is performed by updating the iteration with $x_i \leftarrow x_i + p_i$. The update then satisfies the constraint $G_2(x_1+p)=0$, while handles and projected points are weakly enforced, and Laplacian smoothing is applied to mesh. However, the deformation energy E is not applied in this substep.

Finally, at operation 320, the system may reapply the sculpting constraints according to a priority ordering. The priority ordering may be the same as the ordering used for step 310, or it may be a different priority ordering.

Constraint design may be performed by pre-coding, inferring from manipulation, or user input to define a constraint-order sequence. Constraints are otherwise jointly infeasible, causing solvers to be either unstable, divergent, or unable to hard-enforce constraints. Rather, an ordered sequence of projections is applied for each sculpture constraint k, $$x_i \leftarrow \text{argmin}_x \|x - x_i\|^2 s \cdot t \cdot g_k(x_k, u_k) = 0 \tag{12}$$

so that when stencils overlap the last projection is strongly enforced with receding order by an application.

Referring now to FIGS. 3-6, several examples are shown of elements of a vector graphic that may be subject to sculpting constraints, and corresponding edits that may be made while approximately satisfying the sculpting constraints and other constraints as described herein.

Figure 4:
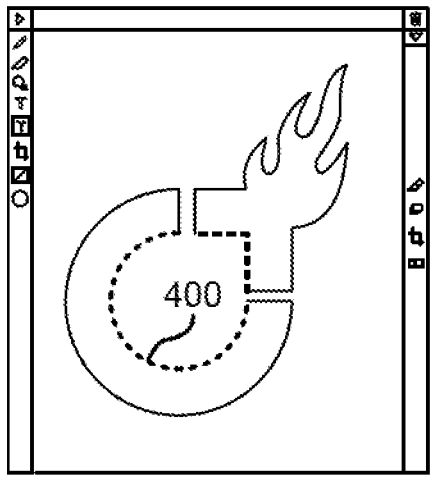
FIG. 4 shows an example of a constraint setup according to aspects of the present disclosure.
Figure 4:
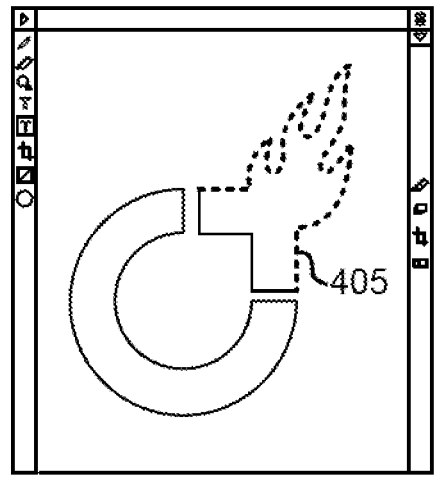
Figure 4:
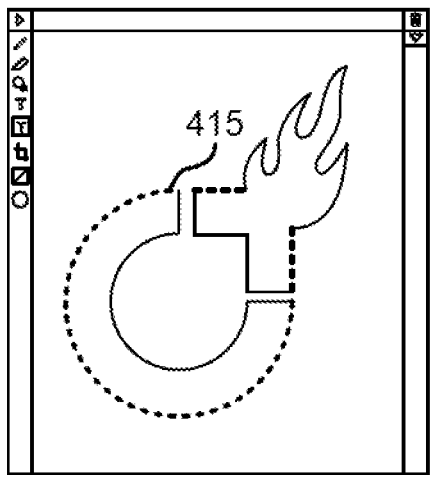
Figure 4:
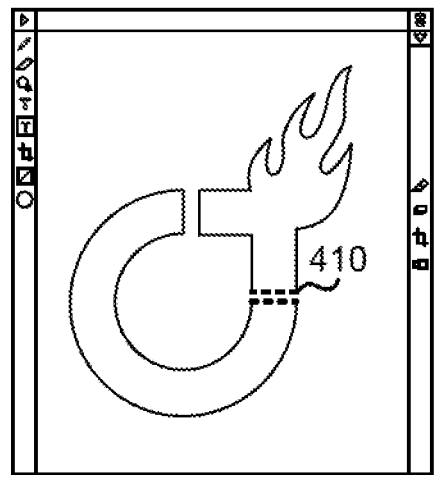

FIG. 4 shows an example of a constraint setup according to aspects of the present disclosure. The example shown includes first constraint 400, second constraint 405, third constraint 410, and fourth constraint 415, all of which may be examples of sculpting constraints imposed on an image. In some examples, these constraints may be set by a user manually. In other examples, the constraints are inferred based on the shape itself.

During manipulation of the image, each of these constraints may be enforced either strictly or approximately, in addition to other constraints described above such as handle constraints, binding constraints, and continuity constraints. For example, the image may be updated based on the runtime loop described with reference to FIG. 3 (after a user moves a control handle). Due to the enforcement of the sculpting constraints, the image may be updated in a desirable way with fewer user edits. The results of the manipulation are shown in FIG. 5.

First constraint 400 shows an example where an arc and a shape including two perpendicular lines are constrained to retain their proportions and position relative to each other. Second constraint 405 is a free-form portion of a vector graphic including multiple curves that may be designated to retain their proportions.

Third constraint 410, as with first constraint 400, shows an example where an arc and a shape including two perpendicular lines are constrained to retain their proportions and position relative to each other. In some cases, another constraint might indication that the shapes included in first constraint 400 and third constraint 410 might be concentric. Fourth constraint 415 shows an example in which two lines segments are constrained to be parallel and to have a same length.

Figure 5:
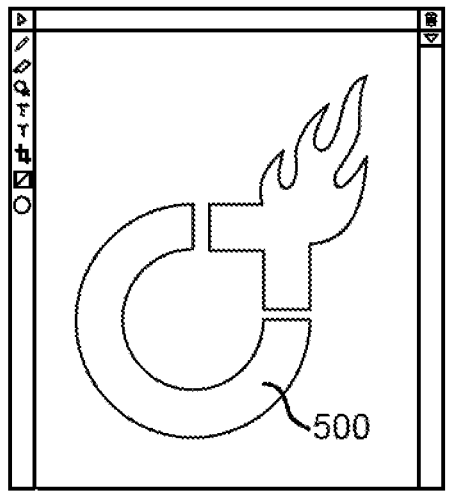
FIG. 5 shows an example of edited vector graphics according to aspects of the present disclosure.
Figure 5:
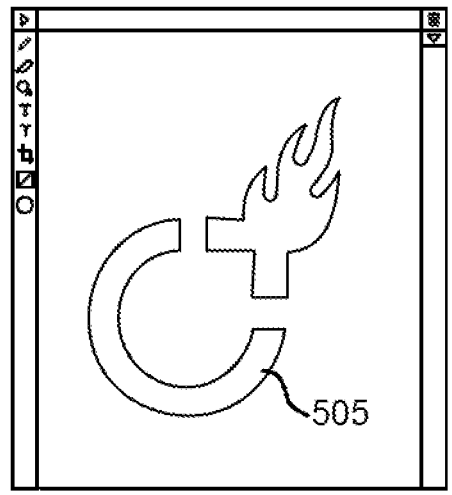
Figure 5:
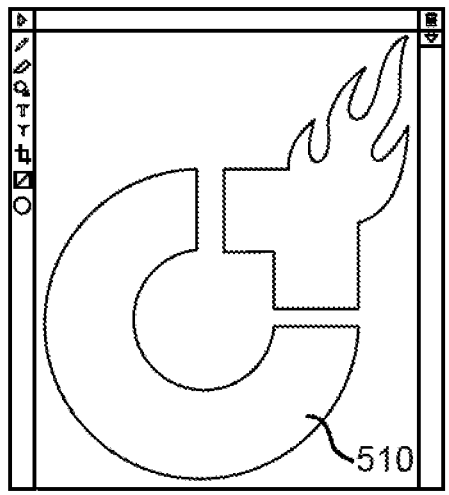
Figure 5:
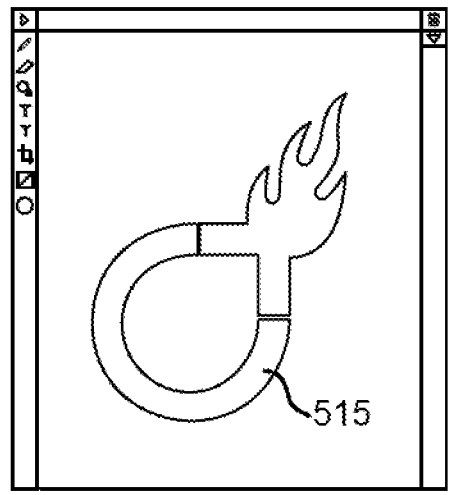

FIG. 5 shows an example of edited vector graphics according to aspects of the present disclosure. The vector graphic shown in FIG. 5 may be subject to the constraints shown in FIG. 4. The example shown includes first edit 500, second edit 505, third edit 510, and fourth edit 515.

FIG. 5 shows various examples of edits that may be made by a user based on the constraints shown in FIG. 4. For example, the various edits displayed in FIG. 5 may show the result of moving a handle point, and then enforcing various constraints including the sculpting constraints shown in FIG. 4.

First edit 500 shows an example of an original shape having the constraints shown in FIG. 3. Second edit 505 shows an example in which certain portions of the vector graphic have been reduced in size subject to sculpting and other constraints. For example, this may be accomplished by moving one or more handle points inward.

Third edit 510 shows an example in which certain portions of the vector graphic have been increased in size subject to sculpting and other constraints. For example, this may the result of moving one or more handle points outward.

Fourth edit 515 shows an example in which certain portions of the vector graphic have been reduced in size subject to sculpting and other constraints, while other portions of the vector graphic have been extended to reduce the size of the gaps between the circular portions and the segments connected to the freeform portion. This may result from moving two or more handle points.

Figure 6:
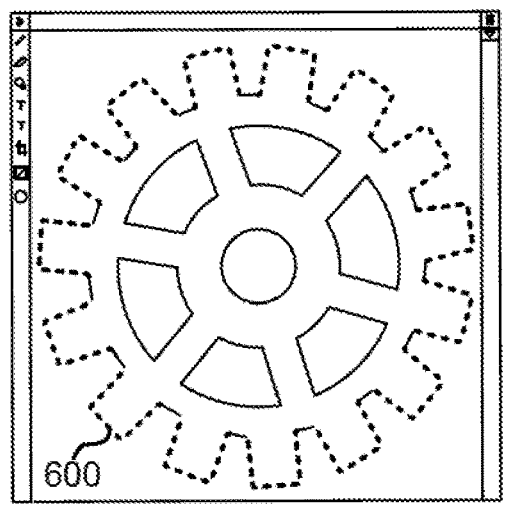
FIG. 6 shows an example of a constraint setup according to aspects of the present disclosure.
Figure 6:
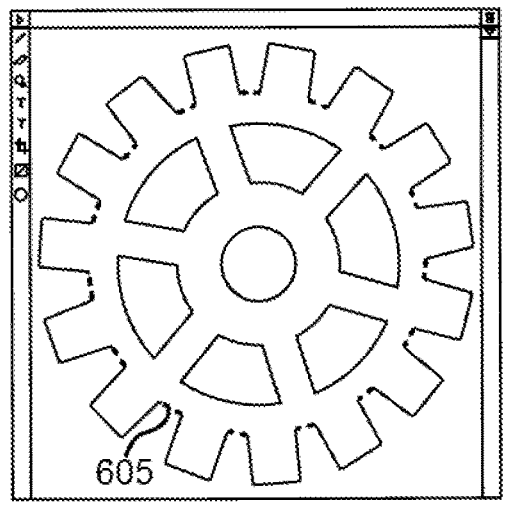
Figure 6:
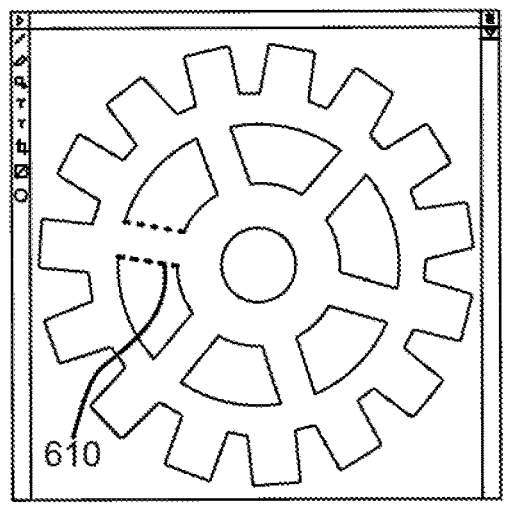

FIG. 6 shows an example of a constraint setup according to aspects of the present disclosure. The example shown includes first constraint 600, second constraint 605, and third constraint 610. First constraint 600, second constraint 605, and third constraint 610 may be examples of sculpting constraints imposed on an image. In other examples, the constraints are inferred based on the shape itself.

During manipulation of the image, each of these constraints may be enforced either strictly or approximately, in addition to other constraints described above such as handle constraints, binding constraints, and continuity constraints. For example, a user may move a handle point, and then the runtime loop described with reference to FIG. 3 may be applied to strictly or approximately enforce the constraints. This may enable a user to manipulate an image more efficiently by moving a small number of handles.

First constraint 600 shows an example of "teeth" of a gear-like vector graphic that are constrained to have constant proportions relative to each other. Second constraint 605 shows an example where regions between the "teeth" of a gear-like vector graphic that are constrained to have constant proportions relative to each other. Third constraint 610 shows an example where parallel lines of a "spoke" of a gear-like vector graphic are constrained to be parallel.

Figure 7:
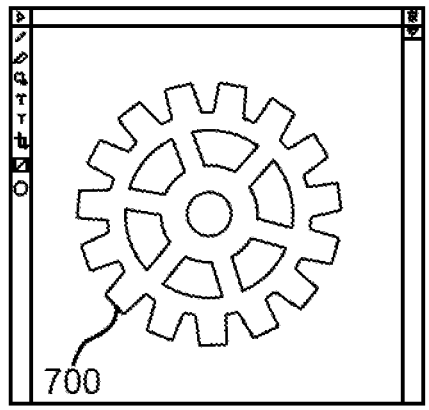
FIG. 7 shows an example of edited vector graphics according to aspects of the present disclosure.
Figure 7:
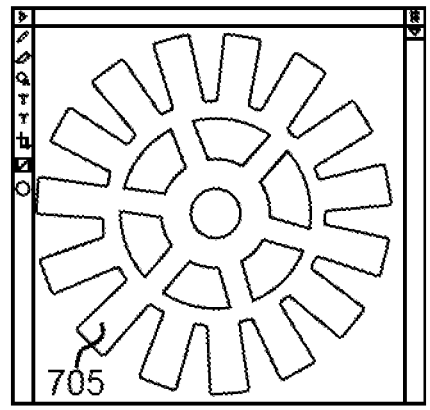
Figure 7:
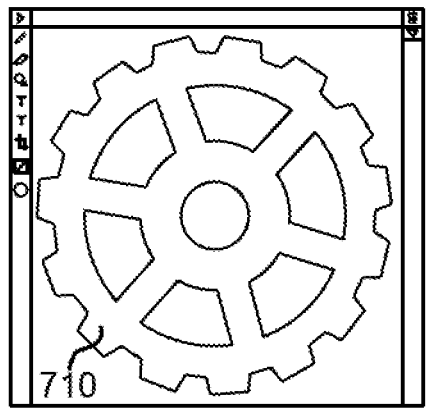
Figure 7:
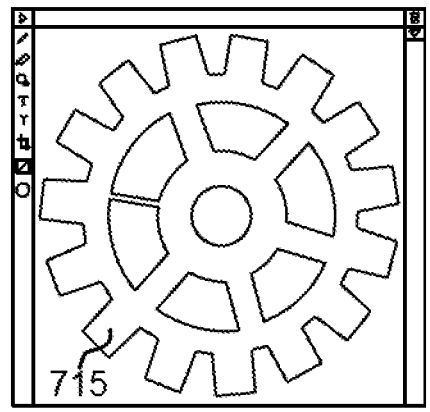

FIG. 7 shows an example of edited vector graphics according to aspects of the present disclosure. The vector graphic shown in FIG. 7 may be subject to the constraints shown in FIG. 6. The example shown includes first edit 700, second edit 705, third edit 710, and fourth edit 715.

FIG. 7 shows various examples of edits that may be made by a user based on the constraints shown in FIG. 6. For example, the various edits displayed in FIG. 7 may show the result of moving a handle point, and then enforcing various constraints including the sculpting constraints shown in FIG. 6.

First edit 700 shows an example of an original shape having the constraints shown in FIG. 6. Second edit 705 shows an example in which the teeth have been extended or increased while retaining their connection to the rest of the vector graphic. This may be achieved by moving a handle point on the outside of a single "tooth" outward and then updating the vector graphic as described with reference to FIG. 3.

Third edit 710 shows an example in which the size of the gear has been increased while reducing the relative size of the teeth. This may be achieved by moving a handle point on the outside of a single "tooth" inward and then updating the vector graphic as described with reference to FIG. 3.

Fourth edit 715 shows an example in which the size of a spoke has been reduced while retaining the integrity of the rest of the design. This may be achieved by moving a handle point on a spoke inward and then updating the vector graphic as described with reference to FIG. 3. Note that based on the constraint 610 from FIG. 6, only a single spoke is constrained. In another example, all of the spokes might be constrained together.

Figure 8:
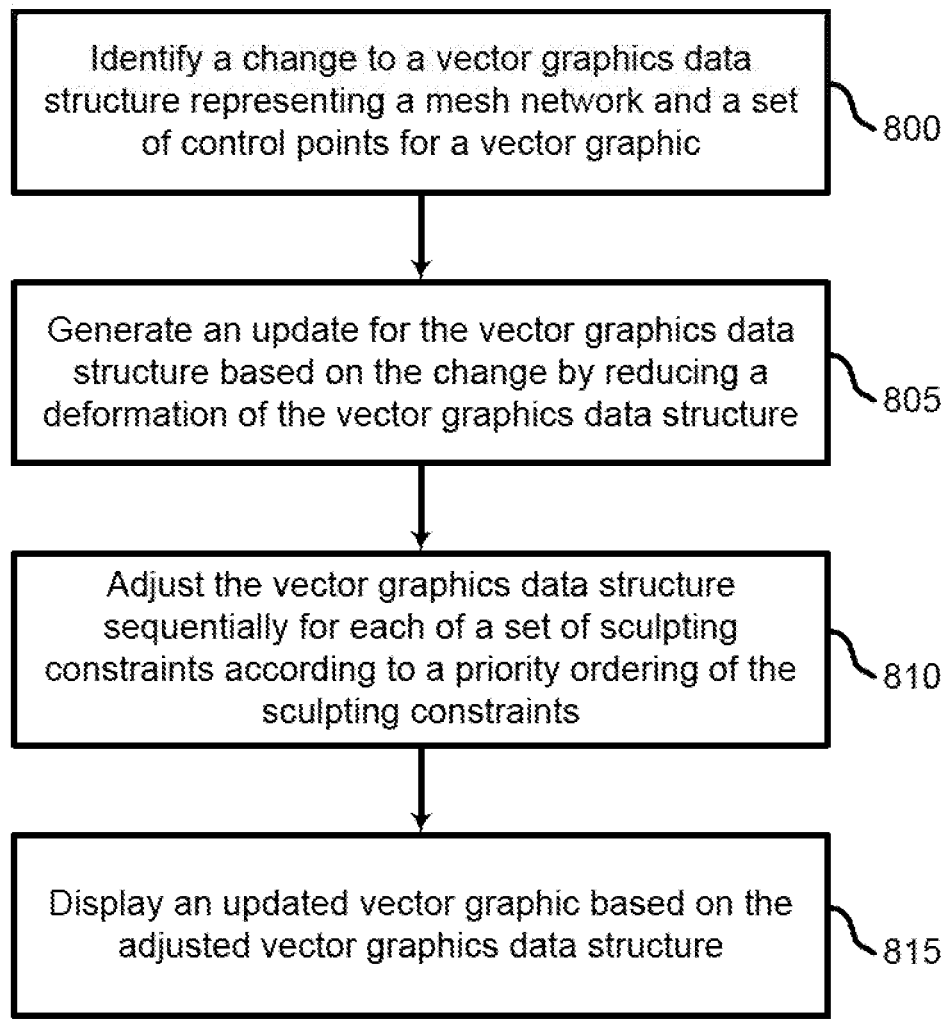
FIGS. 8 through 10 show examples of processes for editing an image based on multiple constraints according to aspects of the present disclosure.

FIG. 8 shows an example of a process for editing an image based on multiple constraints according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 800, the system identifies a change to a vector graphics data structure representing a mesh network and a set of control points for a vector graphic. According to an exemplary embodiment, an update loop may include a rebuild check that includes checking for changes in the mesh network. If any terms are new, dependent structures relying on the updated terms may be reset and recomputed. In some cases, the operations of this step may refer to, or be performed by, a mesh component as described with reference to FIG. 1.

At operation 805, the system generates an update for the vector graphics data structure based on the change by reducing a deformation of the vector graphics data structure. For example, a constrained Sobolev-preconditioned gradient-descent may be performed to update the current solution to reduce deformation while enforcing global handle, binding and continuity constraints and also enforcing sculpting constraints. For example, the handle, binding constraints, and continuity constraints may be exactly enforced, while the sculpting constraints may be approximately enforced.

According to some embodiments, the constrained Sobolev-preconditioned gradient-descent may be solved based on a first QP solver. In some cases, the operations of this step may refer to, or be performed by, a deformation component as described with reference to FIG. 1.

At operation 810, the system adjusts the vector graphics data structure sequentially for each of a set of sculpting constraints according to a priority ordering of the sculpting constraints. For example, a priority-ordered projection may be performed to sequentially project the current solution to satisfy sculpting constraints based on the current priority ordering. In some cases, the operations of this step may refer to, or be performed by, a priority ordering component as described with reference to FIG. 1.

At operation 815, the system displays an updated vector graphic based on the adjusted vector graphics data structure. In some cases, the operations of this step may refer to, or be performed by, a vector graphics component as described with reference to FIG. 1.

Figure 9:
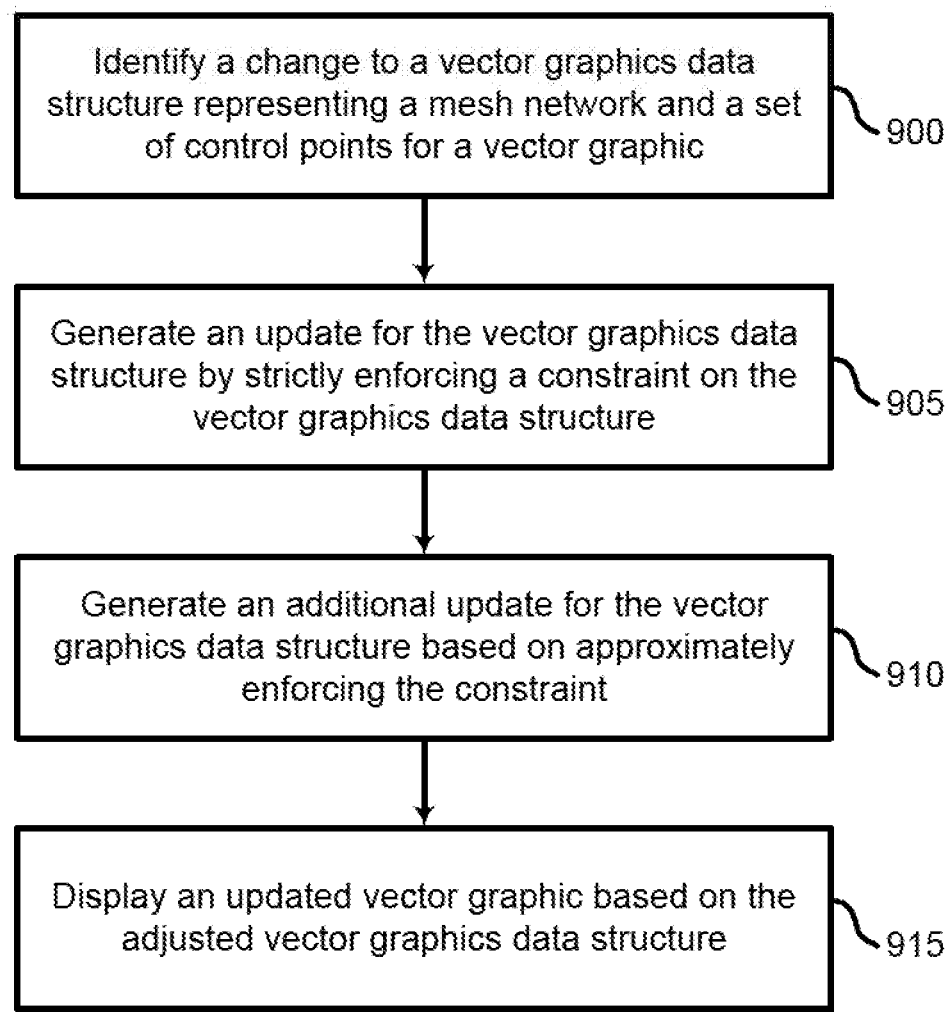

FIG. 9 shows an example of a process for editing an image based on multiple constraints according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 900, the system identifies a change to a vector graphics data structure representing a mesh network and a set of control points for a vector graphic. According to an exemplary embodiment, an update loop may include a rebuild check that includes checking for changes in the mesh network. If any terms are new, dependent structures relying on the updated terms may be reset and recomputed. In some cases, the operations of this step may refer to, or be performed by, a mesh component as described with reference to FIG. 1.

At operation 905, the system generates an update for the vector graphics data structure by strictly enforcing a constraint on the vector graphics data structure. For example, a constrained Sobolev-preconditioned gradient-descent may be performed to update the current solution to reduce deformation while enforcing global handle, binding and continuity constraints and approximately enforcing sculpting constraints. The constrained Sobolev-preconditioned gradient-descent may be solved based on a first QP solver. In some cases, the operations of this step may refer to, or be performed by, a deformation component as described with reference to FIG. 1.

At operation 910, the system generates an additional update for the vector graphics data structure based on approximately enforcing the constraint. For example, a constrained continuity and binding step may solve a second QP to re-project the current solution to enforce global binding and continuity constraints while approximately enforcing the updated sculpting and handle constraints. In some cases, the operations of this step may refer to, or be performed by, a constrained solver as described with reference to FIG. 1.

At operation 915, the system displays an updated vector graphic based on the adjusted vector graphics data structure. In some cases, the operations of this step may refer to, or be performed by, a vector graphics component as described with reference to FIG. 1.

Figure 10:
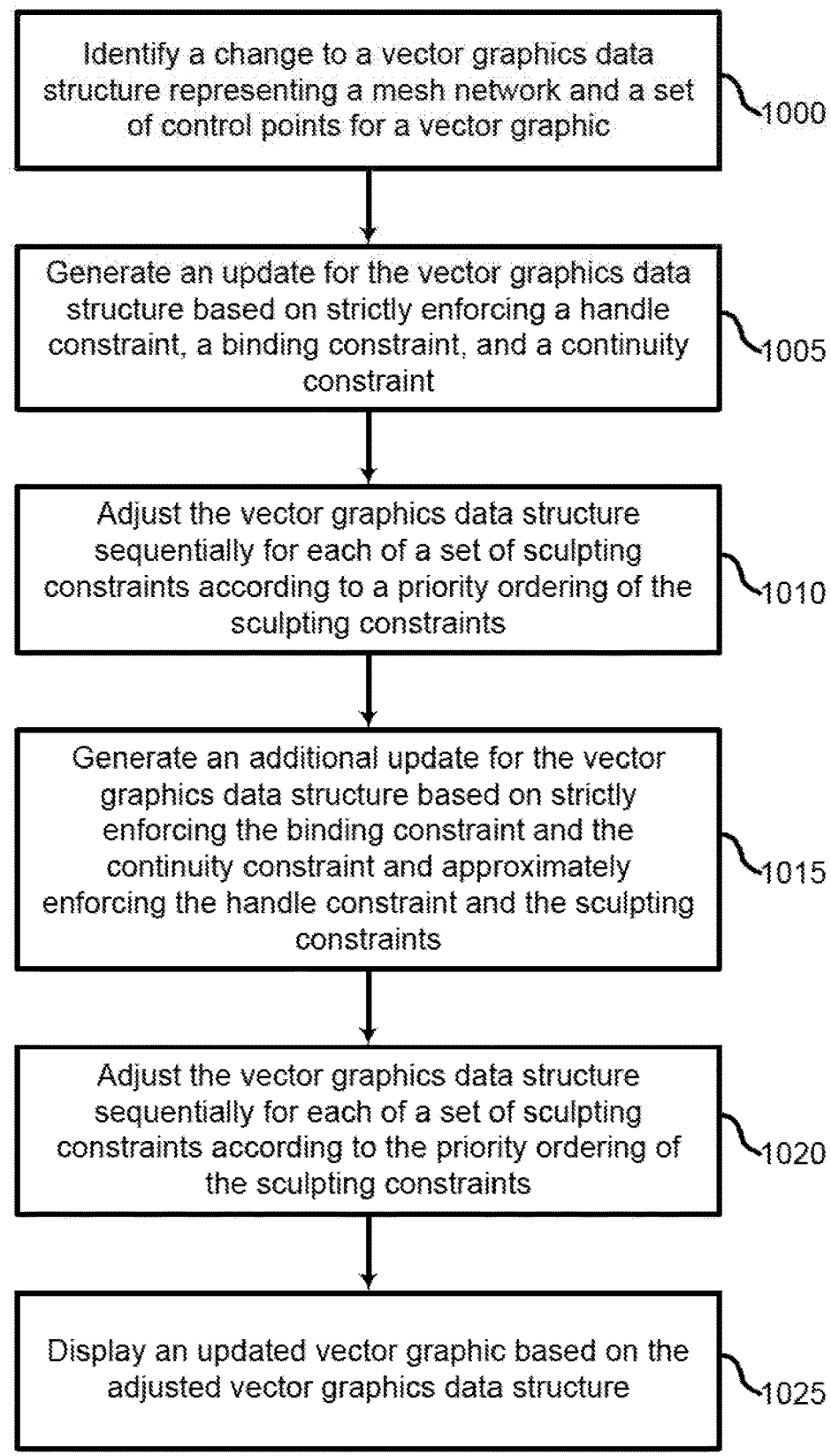

FIG. 10 shows an example of a process for editing an image based on multiple constraints according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 1000, the system identifies a change to a vector graphics data structure representing a mesh network and a set of control points for a vector graphic. According to an exemplary embodiment, an update loop may include a rebuild check that includes checking for changes in the mesh network. If any terms are new, dependent structures relying on the updated terms may be reset and recomputed. In some cases, the operations of this step may refer to, or be performed by, a mesh component as described with reference to FIG. 1.

At operation 1005, the system generates an update for the vector graphics data structure based on strictly enforcing a handle constraint, a binding constraint, and a continuity constraint. For example, a constrained Sobolev-preconditioned gradient-descent may be performed to update the current solution to reduce deformation while enforcing global handle, binding and continuity constraints and approximately enforcing sculpting constraints. The constrained Sobolev-preconditioned gradient-descent may be solved based on a first QP solver. In some cases, the operations of this step may refer to, or be performed by, a deformation component as described with reference to FIG. 1.

At operation 1010, the system adjusts the vector graphics data structure sequentially for each of a set of sculpting constraints according to a priority ordering of the sculpting constraints. For example, a priority-ordered projection may be performed to sequentially project the current solution to satisfy sculpting constraints based on the current priority ordering. In some cases, the operations of this step may refer to, or be performed by, a priority ordering component as described with reference to.

At operation 1015, the system generates an additional update for the vector graphics data structure based on strictly enforcing the binding constraint and the continuity constraint and approximately enforcing the handle constraint and the sculpting constraints. For example, a constrained continuity and binding step may solve a second QP to re-project the current solution to enforce global binding and continuity constraints while approximately enforcing the updated sculpting and handle constraints. In some cases, the operations of this step may refer to, or be performed by, a constrained solver as described with reference to FIG. 1.

At operation 1020, the system adjusts the vector graphics data structure sequentially for each of a set of sculpting constraints according to the priority ordering of the sculpting constraints. For example, another priority-ordered projection may be used to re-project the current solution to satisfy sculpting constraints. In some cases, the operations of this step may refer to, or be performed by, a priority ordering component as described with reference to.

At operation 1025, the system displays an updated vector graphic based on the adjusted vector graphics data structure. In some cases, the operations of this step may refer to, or be performed by, a vector graphics component as described with reference to FIG. 1.

Accordingly, the present disclosure includes the following embodiments.

A method for editing an image based on multiple constraints is described. Embodiments of the method may include identifying a change to a vector graphics data structure representing a mesh network and a plurality of control points for a vector graphic, generating an update for the vector graphics data structure based on the change by reducing a deformation of the vector graphics data structure, adjusting the vector graphics data structure sequentially for each of a plurality of sculpting constraints according to a priority ordering of the sculpting constraints, and displaying an updated vector graphic based on the adjusted vector graphics data structure.

An apparatus for editing an image based on multiple constraints is described. The apparatus may include a processor, memory in electronic communication with the processor, and instructions stored in the memory. The instructions may be operable to cause the processor to identify a change to a vector graphics data structure representing a mesh network and a plurality of control points for a vector graphic, generate an update for the vector graphics data structure based on the change by reducing a deformation of the vector graphics data structure, adjust the vector graphics data structure sequentially for each of a plurality of sculpting constraints according to a priority ordering of the sculpting constraints, and display an updated vector graphic based on the adjusted vector graphics data structure.

A non-transitory computer readable medium storing code for editing an image based on multiple constraints is described. In some examples, the code comprises instructions executable by a processor to: identify a change to a vector graphics data structure representing a mesh network and a plurality of control points for a vector graphic, generate an update for the vector graphics data structure based on the change by reducing a deformation of the vector graphics data structure, adjust the vector graphics data structure sequentially for a plurality of sculpting constraints according to a priority ordering of the sculpting constraints, and display an updated vector graphic based on the adjusted vector graphics data structure.

In some examples, the vector graphic comprises a set of Bezier curves defined by the plurality of control points. In some examples, the mesh network comprises a triangular mesh defined by a plurality of nodes. In some examples, each of the plurality of sculpting constraints comprises a function of the vector graphics data structure and at least one constraint parameter. In some examples, the deformation of the vector graphics data structure is based on a mesh binding constraint, and curve continuity constraint, or a handle constraint.

Some examples of the method, apparatus, and non-transitory computer readable medium described above may further include receiving an editing command from a user, wherein the change is based on the editing command. In some examples, the editing command comprises movement of a handle point on the vector graphic.

In some examples, the update is based at least in part on a gradient descent of a deformation energy of the mesh network and strict enforcement of a constraint on the vector graphics data structure. In some examples, the gradient descent is a constrained Sobolev-preconditioned gradient descent.

Some examples of the method, apparatus, and non-transitory computer readable medium described above may further include generating an additional update for the vector graphics data structure based on approximately enforcing the constraint and the plurality of sculpting constraints. In some examples, the update is based on a first quadratic programming (QP) solver, and the additional update is based on a second QP solver.

Some examples of the method, apparatus, and non-transitory computer readable medium described above may further include adjusting the vector graphics data structure sequentially for each of the plurality of sculpting constraints according to the priority ordering an additional time based on the additional update.

A method for editing an image based on multiple constraints is described. Embodiments of the method may include identifying a change to a vector graphics data structure representing a mesh network and a plurality of control points for a vector graphic, generating an update for the vector graphics data structure by strictly enforcing a constraint on the vector graphics data structure, generating an additional update for the vector graphics data structure based on approximately enforcing the constraint, and displaying an updated vector graphic based on the adjusted vector graphics data structure.

An apparatus for editing an image based on multiple constraints is described. The apparatus may include a processor, memory in electronic communication with the processor, and instructions stored in the memory. The instructions may be operable to cause the processor to identify a change to a vector graphics data structure representing a mesh network and a plurality of control points for a vector graphic, generate an update for the vector graphics data structure by strictly enforcing a constraint on the vector graphics data structure, generate an additional update for the vector graphics data structure based on approximately enforcing the constraint, and display an updated vector graphic based on the adjusted vector graphics data structure.

A non-transitory computer readable medium storing code for editing an image based on multiple constraints is described. In some examples, the code comprises instructions executable by a processor to: identify a change to a vector graphics data structure representing a mesh network and a plurality of control points for a vector graphic, generate an update for the vector graphics data structure by strictly enforcing a constraint on the vector graphics data structure, generate an additional update for the vector graphics data structure based on approximately enforcing the constraint, and display an updated vector graphic based on the adjusted vector graphics data structure.

Some examples of the method, apparatus, and non-transitory computer readable medium described above may further include adjusting the vector graphics data structure sequentially for each of a plurality of sculpting constraints according to a priority ordering of the sculpting constraints, wherein the additional update is based on the adjusted vector graphics data structure.

Some examples of the method, apparatus, and non-transitory computer readable medium described above may further include adjusting the vector graphics data structure sequentially for each of a plurality of sculpting constraints an additional time following the additional update. In some examples, the constraint comprises a handle constraint, and wherein the update and the additional update are further based on strictly enforcing a binding constraint and a continuity constraint.

A method for editing an image based on multiple constraints is described. Embodiments of the method may include identifying a change to a vector graphics data structure representing a mesh network and a plurality of control points for a vector graphic, generating an update for the vector graphics data structure based on strictly enforcing a handle constraint, a binding constraint, and a continuity constraint, adjusting the vector graphics data structure sequentially for each of a plurality of sculpting constraints according to a priority ordering of the sculpting constraints, generating an additional update for the vector graphics data structure based on strictly enforcing the binding constraint and the continuity constraint and approximately enforcing the handle constraint and the sculpting constraints, adjusting the vector graphics data structure sequentially for each of a plurality of sculpting constraints according to the priority ordering of the sculpting constraints, and displaying an updated vector graphic based on the adjusted vector graphics data structure.

An apparatus for editing an image based on multiple constraints is described. The apparatus may include a processor, memory in electronic communication with the processor, and instructions stored in the memory. The instructions may be operable to cause the processor to identify a change to a vector graphics data structure representing a mesh network and a plurality of control points for a vector graphic, generate an update for the vector graphics data structure based on strictly enforcing a handle constraint, a binding constraint, and a continuity constraint, adjust the vector graphics data structure sequentially for each of a plurality of sculpting constraints according to a priority ordering of the sculpting constraints, generate an additional update for the vector graphics data structure based on strictly enforcing the binding constraint and the continuity constraint and approximately enforcing the handle constraint and the sculpting constraints, adjust the vector graphics data structure sequentially for each of a plurality of sculpting constraints according to the priority ordering of the sculpting constraints, and display an updated vector graphic based on the adjusted vector graphics data structure.

A non-transitory computer readable medium storing code for editing an image based on multiple constraints is described. In some examples, the code comprises instructions executable by a processor to: identify a change to a vector graphics data structure representing a mesh network and a plurality of control points for a vector graphic, generate an update for the vector graphics data structure based on strictly enforcing a handle constraint, a binding constraint, and a continuity constraint, adjust the vector graphics data structure sequentially for each of a plurality of sculpting constraints according to a priority ordering of the sculpting constraints, generate an additional update for the vector graphics data structure based on strictly enforcing the binding constraint and the continuity constraint and approximately enforcing the handle constraint and the sculpting constraints, adjust the vector graphics data structure sequentially for each of a plurality of sculpting constraints according to the priority ordering of the sculpting constraints, and display an updated vector graphic based on the adjusted vector graphics data structure.

In some examples, the handle constraint comprises a position of a handle point of the vector graphic. In some examples, the binding constraint comprises a sample of points of the vector graphic and barycentric coordinate weights based on the mesh network for each of the sample of points.

In some examples, the continuity constraint comprises a representation of the connectivity between two or more segments of the vector graphic. In some examples, each of the plurality of sculpting constraints comprises a relationship between different parts of the vector graphic.

Some examples of the method, apparatus, and non-transitory computer readable medium described above may further include repeating an update loop a plurality of times based on the change to the vector graphics data structure. Some examples may further include displaying the updated vector graphic after each iteration of the update loop.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for editing a vector graphic, the method comprising:
    receiving a command to edit the vector graphic, wherein the vector graphic is represented by a vector graphics data structure including a mesh network and a plurality of control points;
    generating an update for the vector graphics data structure by reducing a deformation of the vector graphics data structure resulting from the command;
    adjusting the vector graphics data structure sequentially for each of a plurality of sculpting constraints according to a priority ordering of the sculpting constraints based on the update; and
    displaying the vector graphic based on the adjusted vector graphics data structure.

2. The method of claim 1, further comprising:
    receiving an indication of at least one of the plurality of sculpting constraints from a user, wherein each of the plurality of sculpting constraints comprises a function of the vector graphics data structure and at least one constraint parameter.

3. The method of claim 1, further comprising:
    identifying a first quadratic programming (QP) model based on a deformation energy of the mesh network, a mesh binding constraint, and curve continuity constraint, or a handle constraint or any combination thereof, wherein the deformation of the vector graphics data structure is based on the QP model.

4. The method of claim 1, wherein generating the update further comprises:
    updating one or more vector points in the vector graphics data structure;
    updating a handle position constraint matrix;
    subtracting a current linear constraint evaluation from a constraint matrix; and
    performing a gradient descent of the deformation energy.

5. The method of claim 4, wherein:
    the gradient descent is a constrained Sobolev-preconditioned gradient descent.

6. The method of claim 4, further comprising:
    generating an additional update for the vector graphics data structure based on the plurality of sculpting constraints.

7. The method of claim 6, further comprising:
    identifying a first QP model and a second QP model, wherein the update is based on the first QP model, and the additional update is based on a second QP model.

8. The method of claim 6, further comprising:
    adjusting the vector graphics data structure sequentially for each of the plurality of sculpting constraints according to the priority ordering an additional time based on the additional update.

9. A method for image editing, comprising:
    identifying a change to a vector graphics data structure representing a mesh network and a plurality of control points for a vector graphic;
    generating an update for the vector graphics data structure based on enforcing a handle constraint, a binding constraint, and a continuity constraint;
    adjusting the vector graphics data structure sequentially for each of a plurality of sculpting constraints according to a priority ordering of the sculpting constraints based on the update;
    generating an additional update for the vector graphics data structure based on enforcing the binding constraint, the continuity constraint, the handle constraint, and the sculpting constraints;
    adjusting the vector graphics data structure sequentially for each of the plurality of sculpting constraints according to the priority ordering of the sculpting constraints based on the additional update; and
    displaying the vector graphic based on the adjusted vector graphics data structure.

10. The method of claim 9, wherein:
    identifying a first quadratic programming (QP) model based on a gradient of a deformation energy of the mesh network, wherein the update is based on the first QP model; and
    identifying a second QP model that does not include a gradient term, wherein the additional update is based on a second QP model.

11. The method of claim 9, further comprising:
    receiving an editing command received from a user, wherein the change is based on the editing command.

12. The method of claim 9, further comprising:
    identifying a position of a handle point of the vector graphic, wherein the handle constraint is based on the position of the handle point.

13. The method of claim 9, further comprising:
    identifying a sample of points of the vector graphic and barycentric coordinate weights based on the mesh network for each of the sample of points, wherein the binding constraint is based on the sample of points and the barycentric coordinate weights.

14. The method of claim 9, further comprising:
    identifying connectivity between two or more segments of the vector graphic, wherein the continuity constraint is based on the connectivity.

15. The method of claim 9, further comprising:
identifying a relationship between multiple parts of the vector graphic, wherein at least one of the sculpting constraints is based on the relationship.

16. The method of claim 9, further comprising:
repeating an update loop a plurality of times based on the change to the vector graphics data structure; and
displaying the vector graphic after each iteration of the update loop.

17. A method for image editing, comprising:
identifying a change to a vector graphics data structure representing a mesh network and a plurality of control points for a vector graphic;
generating an update for the vector graphics data structure by strictly enforcing a constraint on the vector graphics data structure, wherein the constraint comprises a handle constraint representing a binding between a free-form editing handle and the mesh network;
generating an additional update for the vector graphics data structure based on approximately enforcing the constraint, wherein approximately enforcing the constraint comprises reducing a deviation from satisfying the constraint below an acceptable threshold; and
displaying the vector graphic based on the update and the additional update.

18. The method of claim 17, further comprising:
adjusting the vector graphics data structure sequentially for each of a plurality of sculpting constraints according to a priority ordering of the sculpting constraints, wherein the additional update is based on the adjusted vector graphics data structure.

19. The method of claim 18, further comprising:
adjusting the vector graphics data structure sequentially for each of the plurality of sculpting constraints an additional time following the additional update.

20. The method of claim 17, wherein:
generating the update comprises strictly enforcing a binding constraint and a continuity constraint.

\* \* \* \* \*